March 17, 1942. R. W. HARTWICK ET AL 2,276,721
FIELD CLOVER DUSTER
Filed Oct. 29, 1940 2 Sheets-Sheet 1
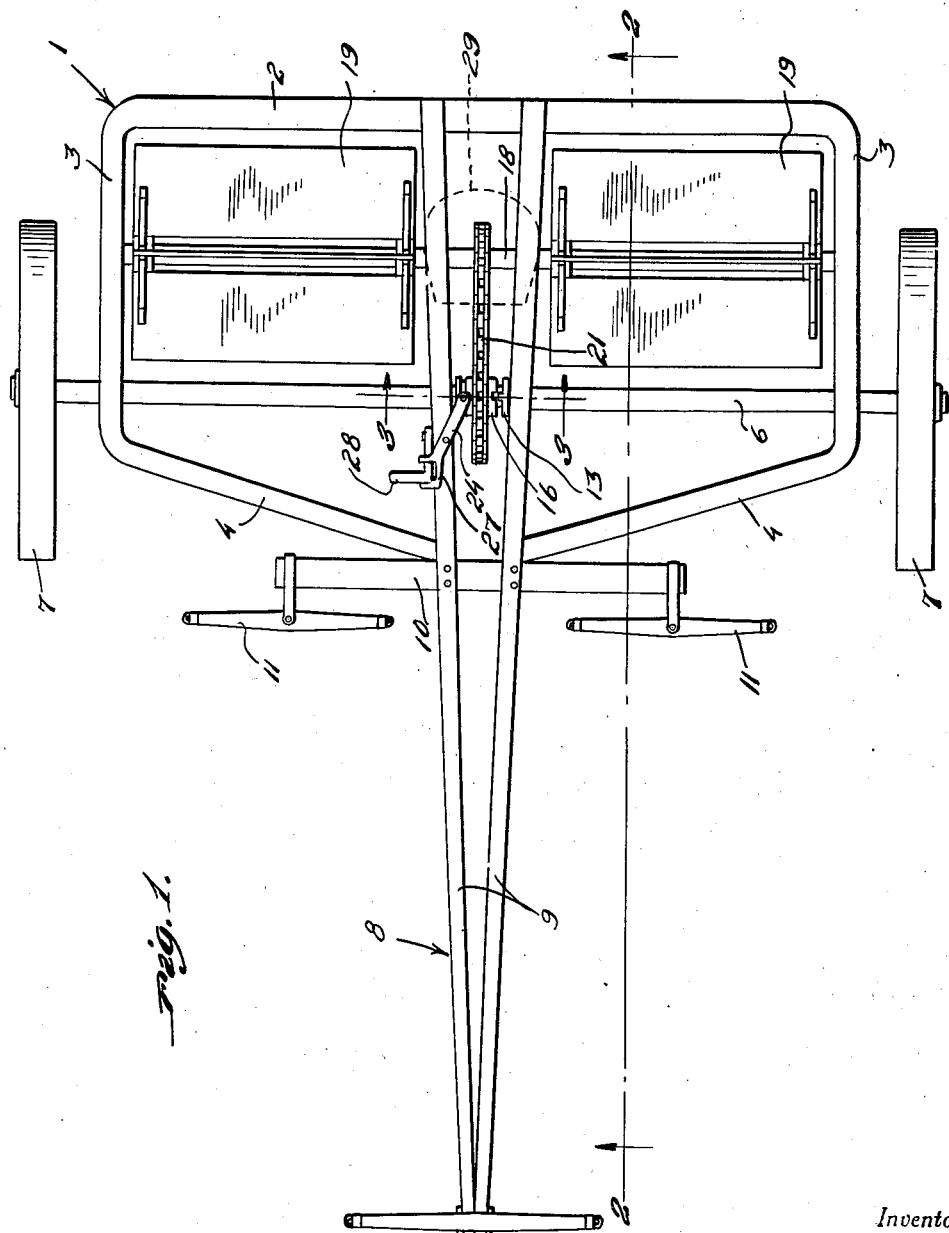
Inventor
Ross Wesley Hartwick
Thomas Hartwick
By Clarence A O'Brien
Attorney March 17, 1942.    R. W. HARTWICK ET AL    2,276,721
FIELD CLOVER DUSTER
Filed Oct. 29, 1940    2 Sheets-Sheet 2
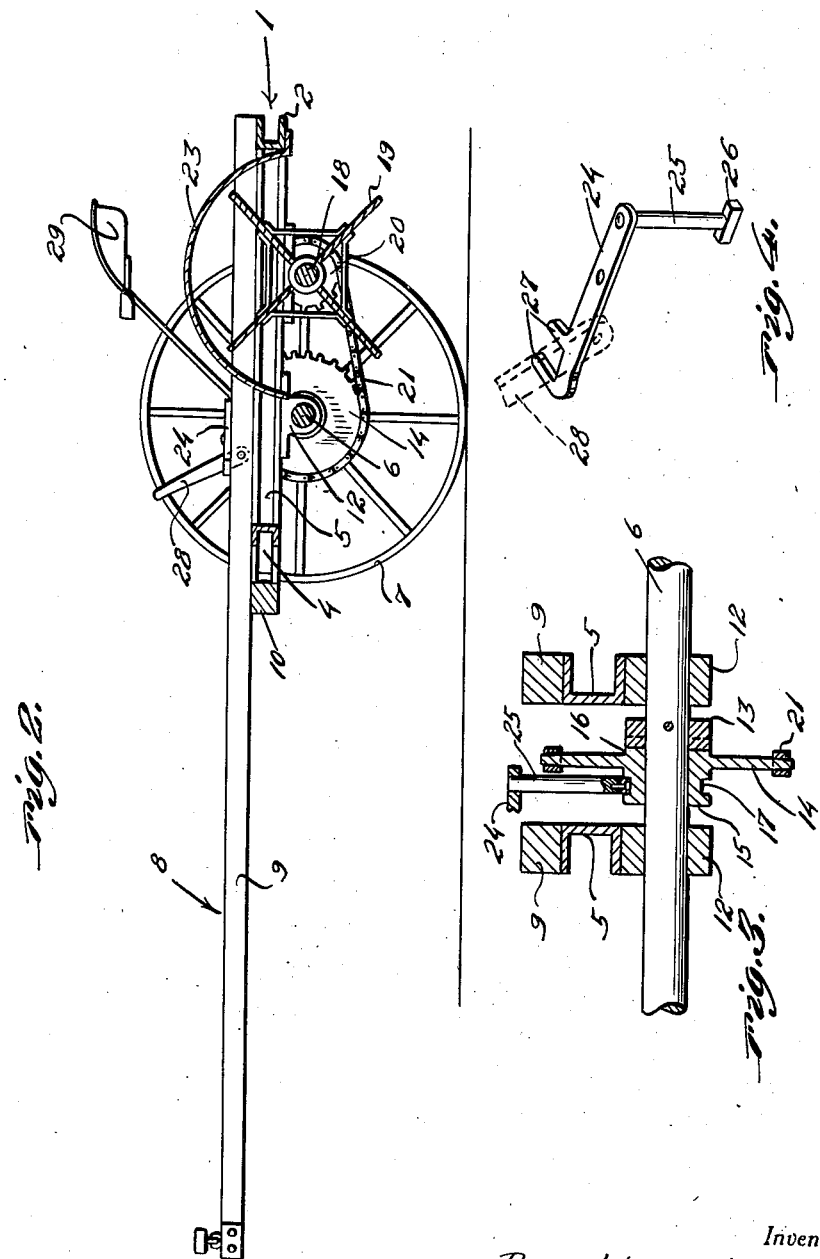
Inventor
Ross Wesley Hartwick
Thomas Hartwick
By Clarence A. O'Brien
Attorney Patented Mar. 17, 1942

2,276,721

UNITED STATES PATENT OFFICE 2,276,721

FIELD CLOVER DUSTER

Ross Wesley Hartwick and Thomas Hartwick, Pinconning, Mich.

Application October 29, 1940, Serial No. 363,364

1 Claim. (Cl. 47—1)

The present invention relates to new and useful improvements in clover dusters and has for its primary object to provide a machine of this character comprising a novel construction and arrangement of traction driven fans adapted to pneumatically shake or agitate and remove dust from growing clover in a field thereby increasing the yield of seed from said clover.

Other objects of the invention are to provide a clover dusting machine of the aforementioned character which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a clover dusting machine constructed in accordance with the present invention, the fan hoods being omitted.

Figure 2 is a view in vertical longitudinal section throughout the machine, taken substantially on the line 2—2 of Figure 1.

Figure 3 is a cross sectional view, taken substantially on the line 3—3 of Figure 1.

Figure 4 is a perspective view of the clutch shifting means.

Referring now to the drawings in detail, it will be seen that the embodiment of the invention which has been illustrated comprises a frame of channel iron which is designated generally by the reference numeral 1. The frame 1 includes a back member 2, side members 3 and a pair of forwardly converging front members 4 which terminate in spaced relation to each other. Extending between the inner ends of the front members 4 and the back member 2 of the frame 1 is a pair of rearwardly diverging channel bars 5.

Journaled in suitable bearings on the forward portions of the side members 3 of the frame 1 is an axle 6. Supporting wheels 7 are fixed on the end portions of the axle 6. Projecting forwardly from the frame 1 is a tongue structure 8. The tongue structure 8 includes a pair of forwardly converging bars 9 having their rear portions secured in any suitable manner on the bars 5. Mounted transversely on the bars 9, immediately adjacent the front of the frame 1, is a bar 10. Singletrees 11 are provided on the end portions of the bar 10.

The axle 6 is also journaled in bearings 12 which are provided therefor beneath the bars 5. Fixed on the axle 6 between the bearings 12 is a clutch member 13. Rotatably and slidably mounted on the axle 6 adjacent the clutch 13 is a sprocket gear 14. On one end of the hub 15 of the sprocket gear 14 is a clutch member 16 which is engageable with the complemental member 13 for connecting said sprocket gear to the axle 6 for rotation therewith. The other end portion of the hub 15 has formed therein a circumferential groove 17 the purpose of which will be presently set forth.

Rotatably mounted beneath the frame 1 parallel with and rearwardly of the axle 6 is a shaft 18. Fixed on the shaft 18 for rotation within the confines of the frame 1 is a pair of centrifugal fans or blowers 19. Fixed on the shaft 18 between the fans 19 is a comparatively small sprocket gear 20. A chain 21 is trained over the sprocket gears 14 and 20 for driving the fans 19 from the wheels 7. Hoods 23 of substantially semi-circular cross section are mounted on the frame 1 over the fans 19.

Pivotally mounted on one of the tongue bars 9 and extending diagonally thereacross is a lever 24. Depending from one end portion of the lever 24 is a shank 25 having rotatably mounted on its lower end a crosshead 26 which is engaged in the groove 17 in the hub 15. At its other end, the lever 24 terminates in a laterally extending fork 27 in which a foot lever 28 is engaged.

It is thought that the operation of the invention will be readily apparent from a consideration of the foregoing. Briefly, as the machine is pulled over a field of growing clover with the clutch members 16 and 13 engaged, the fans 19 are driven at the required speed from the ground wheels 7. Thus, air is blown downwardly on the clover as the machine passes thereover for agitating said clover and removing dust therefrom. The yield of seed from clover thus treated is substantially increased. The fans 19 may be rendered inoperative when desired by disengaging the clutch member 16 from the clutch member 13 through the medium of the foot lever 28. The reference numeral 29 designates a seat for the operator on the machine.

It is believed that the many advantages of a clover dusting machine constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

In a clover dusting machine, a substantially rectangular shaped frame including a rear member, parallel side members, front converging members terminating in spaced relation to each other and rearwardly diverging bars connecting the ends of the front members to the rear member, an axle underlying and extending endwise of the frame and journaled on the side members and said bars, ground wheels secured to said axle, a draft tongue including rearwardly diverging members resting on and secured to said bars, a shaft paralleling the axle rearwardly of the latter and journaled on the end members and said bars, groups of radially extending arms secured on the shaft, elongated fan blades secured to the arms, a manually controlled clutch type drive connecting the axle to said shaft, and hoods secured to the frame and overlying the fan blades.

ROSS WESLEY HARTWICK.
THOMAS HARTWICK.